United States Patent [19]
Suzuki et al.

[11] Patent Number: 5,649,207
[45] Date of Patent: Jul. 15, 1997

[54] MICROPROCESSOR UNIT HAVING INTERRUPT MECHANISM

[75] Inventors: Hiroshi Suzuki, Chiba; Yasuo Yamada, Tokyo, both of Japan

[73] Assignee: Kawasaki Steel Corporation, Hyogo, Japan

[21] Appl. No.: 348,373

[22] Filed: Dec. 1, 1994

[51] Int. Cl.⁶ .................................................. G06F 13/00
[52] U.S. Cl. ........................... 395/733; 395/740; 395/741
[58] Field of Search ................................... 395/733, 734, 395/739, 740, 741, 742

[56] References Cited

U.S. PATENT DOCUMENTS 4,484,271  11/1984  Miu et al. ................................. 364/200
5,187,791  2/1993  Baum ....................................... 395/725
5,291,604  3/1994  Kardach et al. ........................ 395/725

FOREIGN PATENT DOCUMENTS 4-288633  10/1992  Japan .

*Primary Examiner*—Jack B. Harvey
*Assistant Examiner*—John Travis
*Attorney, Agent, or Firm*—Bardehle, Pagenberg, Dost, Altenburg, Frohwitter, Geissler & Partners

[57] ABSTRACT

A microprocessor unit having an interrupt mechanism capable of altering the branching destination depending on the kind of the command being executed upon receipt of an interrupt, thereby offering high degrees of operational freedom and flexibility with a minimum of increase in the scope of MPU circuitry.

4 Claims, 7 Drawing Sheets

MICROPROCESSOR UNIT HAVING INTERRUPT MECHANISM

BACKGROUND OF THE INVENTION

1. Field of the Invention

The present invention relates to a microprocessor unit (called the MPU hereunder where appropriate) having an interrupt mechanism.

2. Description of the Prior Art

Recent advances in LSI (large scale integration) technology have led to a growing number of LSI applications such as those in which a single LSI chip constitutes a computer system and those in which the so-called custom LSI chip incorporates a central processing unit (CPU). Such diverse LSI applications comprise in a variety of ways a microprocessor unit that not only executes a large number of commands in a predetermined sequence; the MPU also has an interrupt mechanism that generally branches to an unsequenced address upon receipt of an interrupt signal. Where a plurality of interrupt conditions exist, a plurality of interrupt input terminals are provided so that the branch destination is varied depending on which interrupt input terminal has received an interrupt signal. Alternatively, the branch destination is determined by the interrupt vector fetched during an interrupt acknowledgment cycle in effect when the interrupt signal is input.

FIG. 4 is a basic constitution of a conventional microprocessor (MPU) with a memory, FIG. 5 is an address map of a memory area containing commands, FIG. 6 is a timing chart in effect when an interrupt signal is input during an execution sequence of an MPU, and FIG. 7 is a timing chart in effect when the interrupt routine of the MPU is terminated during the execution sequence of the MPU.

As shown in FIG. 4, the microprocessor 10 includes internal registers 12, an arithmetic logic unit (ALU) 14, a program counter (PC) 16, a stack pointer 18, an interrupt vector (IV) 20, a multiplexer (MPX) 22 for selecting address inputted to a memory 30 and an interrupt control circuit 24 for receiving an interrupt signal INT__.

What follows is a brief description of how an interrupt illustratively takes place. Only one interrupt is assumed to occur in this example for the sake of simplicity.

The main routine is stored in a region including addresses 1234 and 1235. The interrupt routine is stored at address 2000 and subsequent addresses. Addresses FFFE and FFFF are used as a stack area in which to save the content of the program counter PC upon interrupt.

In FIGS. 6 and 7, CLK stands for a clock signal, MRD__ for a memory read signal, MWR__ for a memory write signal, AD for an address signal, DATA for a data signal, PC for a program counter contents, and INT__ for the interrupt signal.

Suppose that, as shown in FIG. 6, the interrupt signal INT__ is asserted (i.e., brought Low) while the main routine command held at address 1234 is being executed. In that case, the interrupt acknowledgment cycle is entered when the command at address 1234 has ended. The low and high-order bytes of the program counter PC are saved respectively to addresses FFFF and FFFE. When the command at address 1234 is executed, the content of the program counter PC points to the next address 1235. Thus the low-order byte "35" of the program counter PC is saved to address FFFF and the high-order byte "12," to address FFFE. The save operation is followed by an interrupt process branching to address 2000, i.e., the first address of the interrupt routine.

When the interrupt routine is terminated, the data "35" and "12" saved respectively at addresses FFFE and FFFF are read therefrom and placed in the program counter PC. The address number pointing to address 1235 is then output so that execution of the main routine is resumed from address 1235.

In addition to a normal interrupt function that may be utilized by the user at his discretion, some MPU's have the so-called debug-dedicated interrupt function. The debug-dedicated interrupt function, usually not for use by the user, is a function used by a debugging apparatus incorporating debugging software. The debugging apparatus, illustratively called an incircuit emulator, is designed to debug user-generated programs. There should be no change in the execution status of the user-generated program regardless of debug interrupt being effected or not. To keep the user from becoming aware of debug interrupt requires that, at the end of the interrupt process handling the debug interrupt, there be restored the same internal status as that in effect when the debug interrupt in question was accepted.

Ordinary MPU's have a HALT command for stopping command execution. Executing the HALT command causes the MPU to halt and to stop executing all subsequent commands.

The halt state is released either upon reset or upon interrupt. This takes place as follows: suppose that the HALT command is stored at address 1234. In that case, as described with reference to FIGS. 6 and 7, the program counter possesses the next address 1235 when execution of the HALT command has resulted in the halt state. When the interrupt routine is terminated, the command held at address 1235 is read and executed.

A problem arises if a debug interrupt occurs when the halt state is in effect upon execution of a user-generated program. That is, despite the need to restore the internal state in effect prior to the debug interrupt, the halt state is released once that interrupt takes place. As a result, the halt state before the interrupt cannot be resumed.

One conventional solution of the above problem is to devise circuitry whereby the circuit operation is changed only if a debug interrupt is accepted during execution of the HALT command; the content of the program counter is then decremented by 1 before being saved into a stack.

One disadvantage of this solution is the need for special hardware by which to decrement the content of the program counter. This results in a growing scope of the circuit configuration involved.

SUMMARY OF THE INVENTION

It is therefore an object of the present invention to provide a microprocessor unit having a minimum scope of circuitry and capable of addressing the debug interrupt in a flexible manner.

In carrying out the invention and according to one aspect thereof, there is provided, a microprocessor unit for executing a plurality of commands sequentially and for branching to an interrupt process upon receipt of an interrupt, the microprocessor unit comprising:

(a) a program counter pointing to an address having the command to be executed next, the address being contiguous to the address where the command currently executed exists;

(b) an interrupt mechanism for saving the content of the program counter into a stack upon receipt of an interrupt and for branching to an interrupt process thereafter; and (c) a branching destination selecting mechanism for selecting, upon receipt of at least one predetermined interrupt, a branching destination in accordance with the kind of the command being executed when the predetermined interrupt was received.

In a preferred structure according to the invention, the plurality of commands includes a HALT command for causing the microprocessor unit to halt command execution, and the branching destination selecting mechanism selects the branching destination depending on whether or not the command being executed when the predetermined interrupt was received, was the HALT command or not.

When a predetermined interrupt is received, the microprocessor unit (MPU) of the invention is capable of selecting the branching destination depending on the kind of the command being executed upon receipt of that interrupt, e.g., depending on whether that command is a HALT command or otherwise. Illustratively, if a debug interrupt is received while the HALT command is being executed, the content of the stack in which the content of the program counter is saved, may be decremented by software. Because the branching destination is altered in accordance with the kind of the command being executed (e.g., depending on the debug interrupt in effect or otherwise), a significantly flexible system is implemented by use of the inventive MPU.

The increase in the scope of hardware stemming from the above constitution is minimal. The change in the microprocessor involves only the branching destination being altered illustratively depending on whether the command is a HALT command or not. The resulting rise in hardware quantity is practically negligible.

These and other objects, features and advantages of the invention will become more apparent upon a reading of the following description and appended drawings.

BRIEF DESCRIPTION OF THE DRAWINGS

A preferred embodiment will be described with reference to the drawings, wherein identical elements have been denoted throughout the figures with identical reference numerals, and wherein.

DESCRIPTION OF THE PREFERRED EMBODIMENT

A preferred embodiment of the present invention will be described below in detail with reference to the accompanying drawings.

Figure 1:
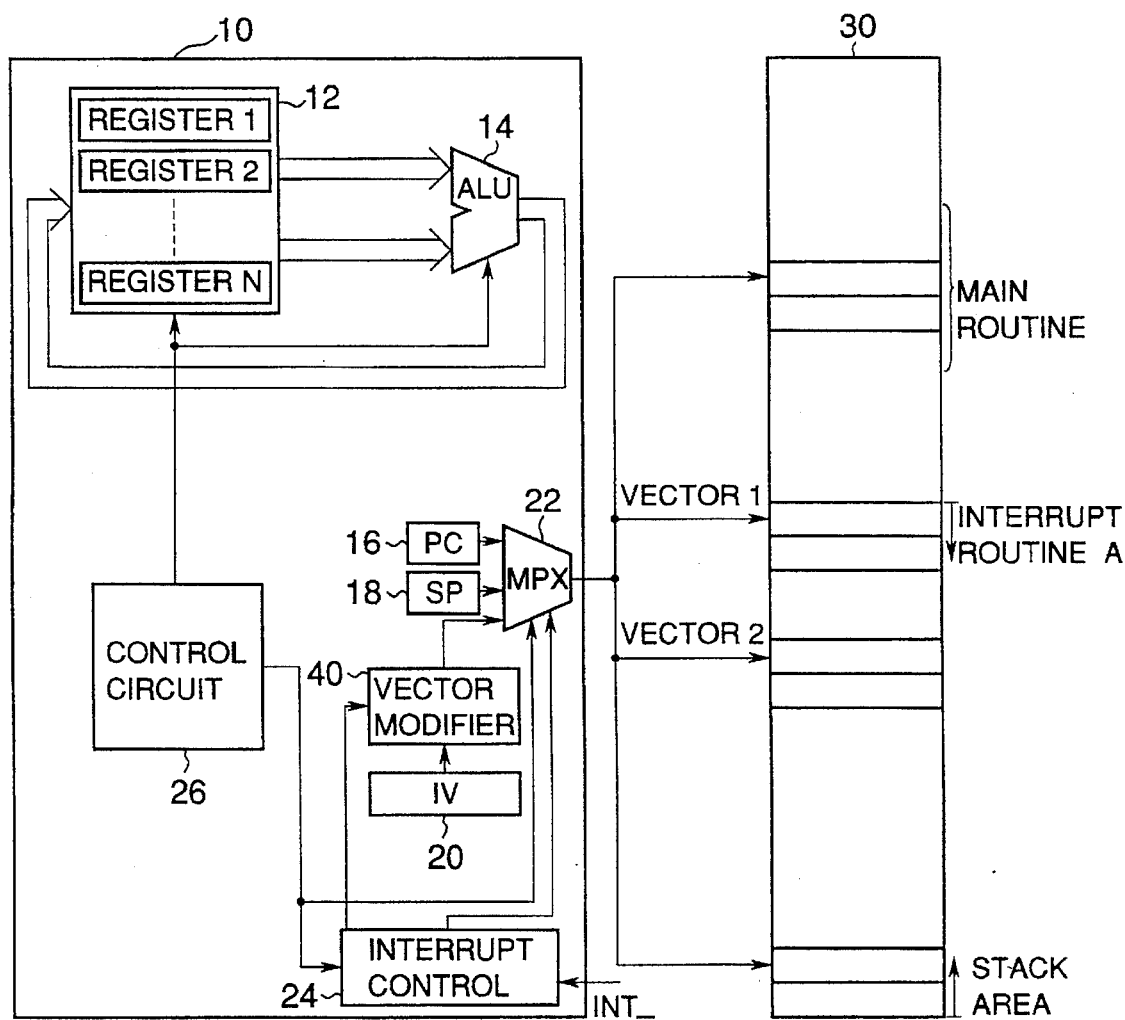
FIG. 1 is a block diagram showing a basic constitution of a microprocessor unit (MPU) with a memory, practiced as a preferred embodiment of the invention.

FIG. 1 is a block diagram showing a basic constitution of a microprocessor unit (MPU) 10 with a memory 30, practiced as a preferred embodiment of the invention.

Figure 4:
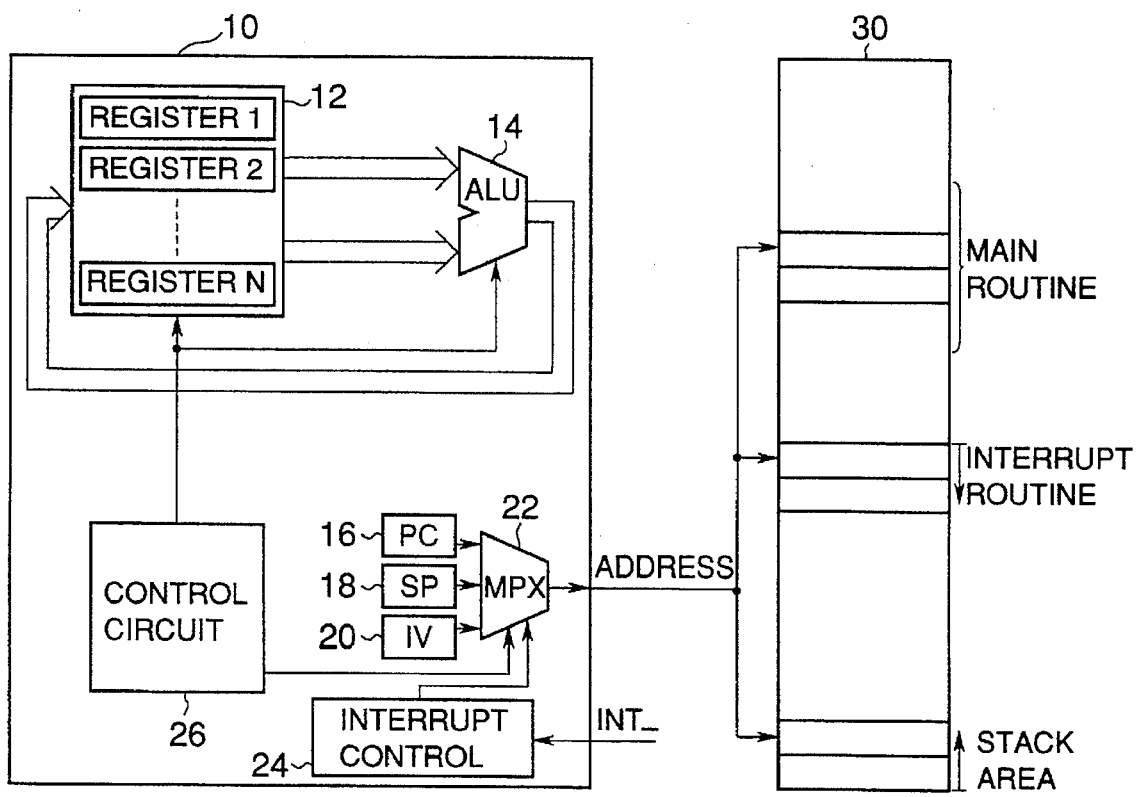
FIG. 4 is a basic constitution of a conventional microprocessor unit (MPU) with a memory.
Figure 5:
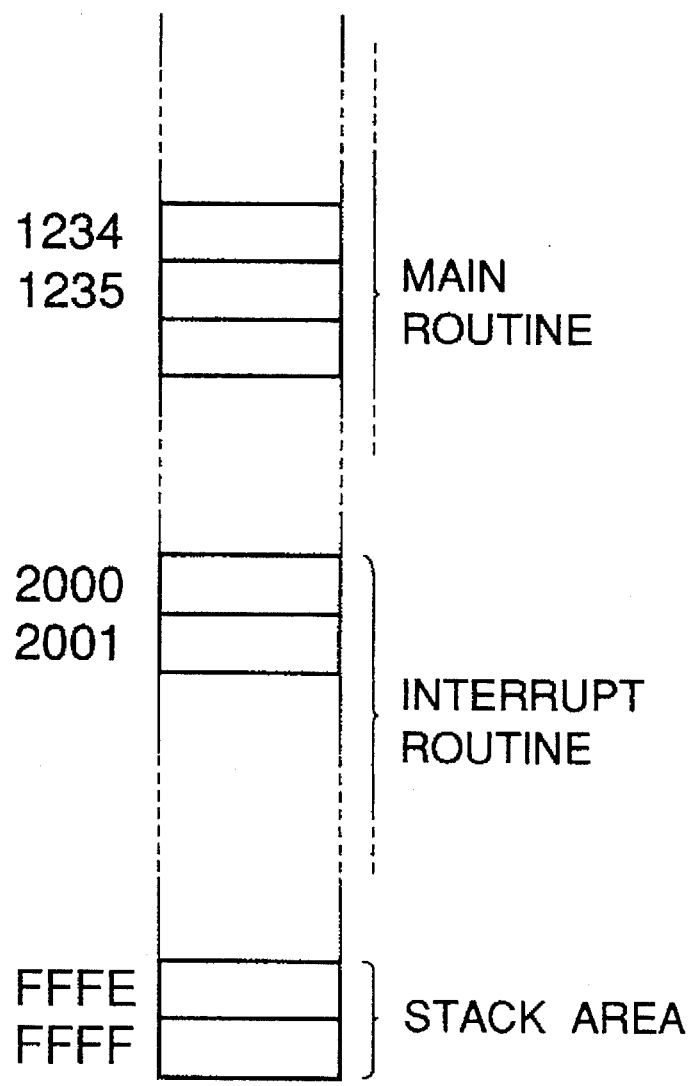
FIG. 5 is an address map of a memory area that stores commands.

Different from the conventional MPU as shown in FIG. 4, the MPU 10 further includes a vector modifier 40. According to kind of command being executed when the INT__ signal was received, the interrupt control circuit 24 changes start address (vector 1 or vector 2) of interrupt process routine by modifying the interrupt vector (IV) 20 through the vector modifier 40.

Figure 2:
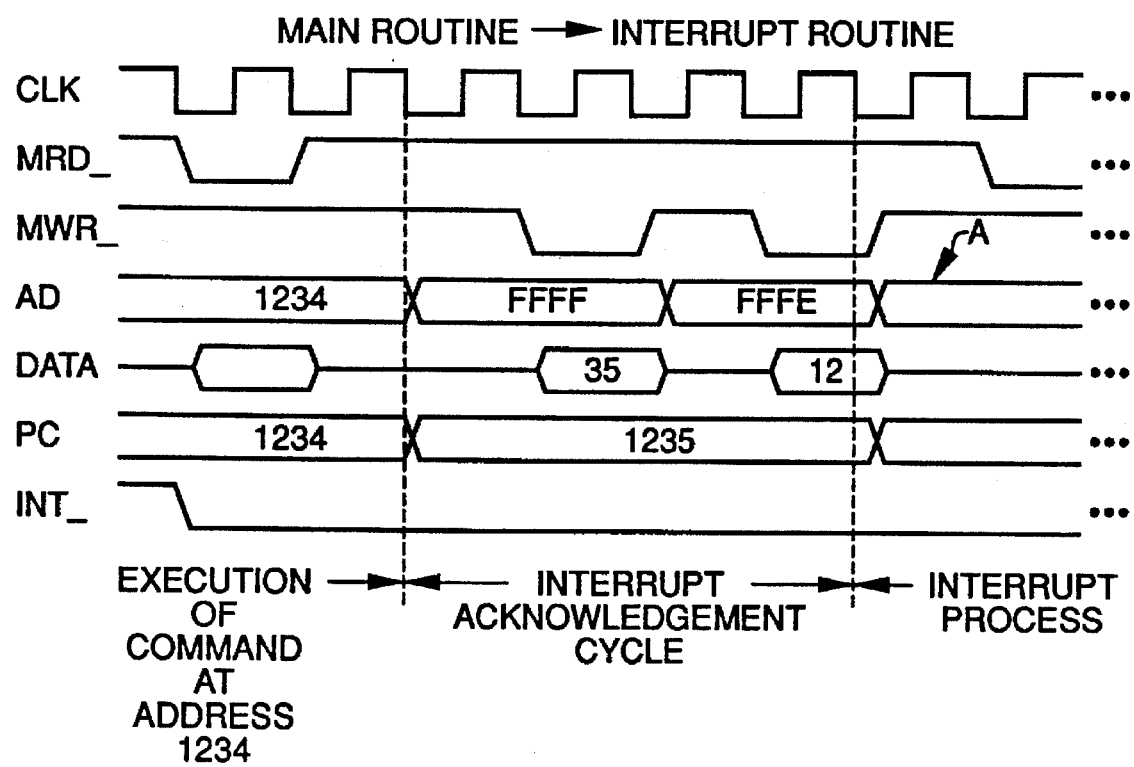
FIG. 2 is a timing chart in effect when a predetermined interrupt is input during an execution sequence of the embodiment.
Figure 3:
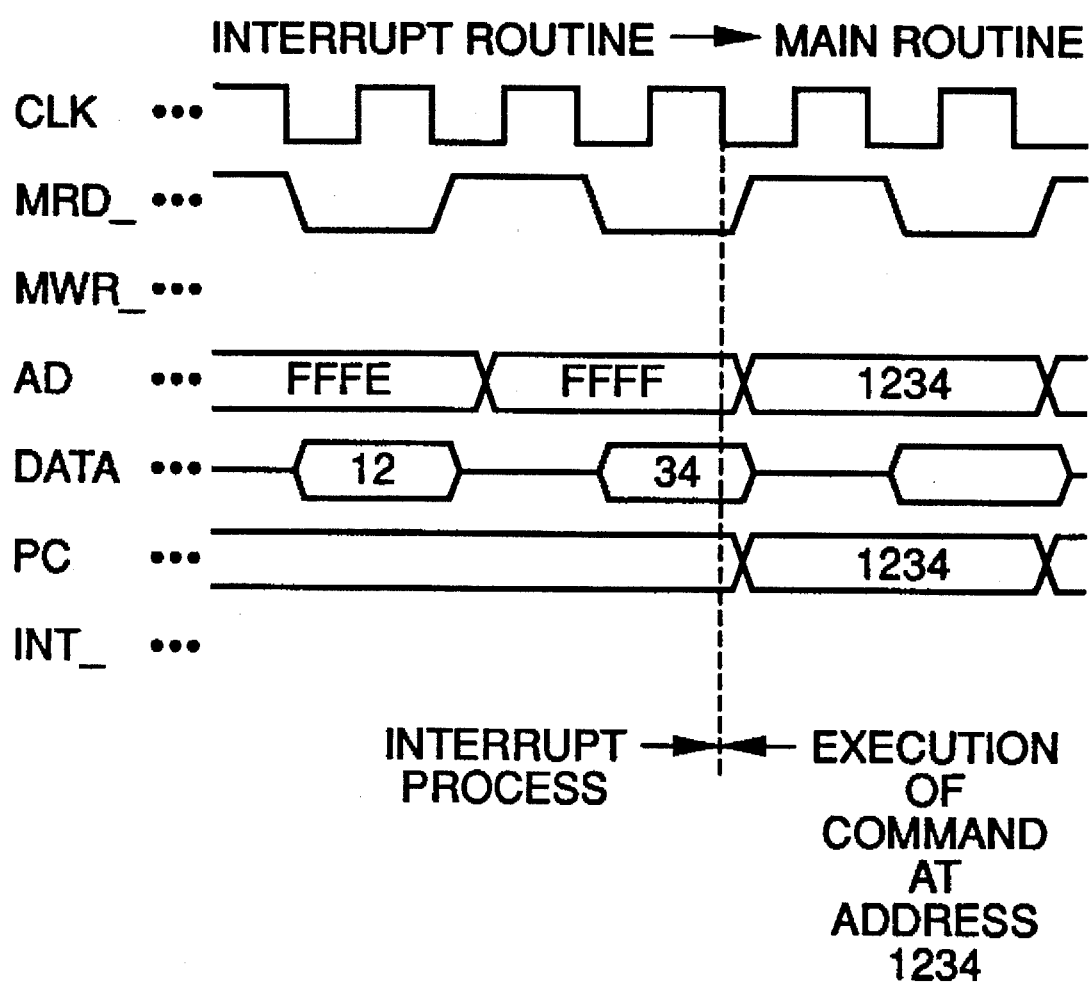
FIG. 3 is a timing chart in effect when the interrupt routine has ended during the execution sequence of the embodiment.
Figure 6:
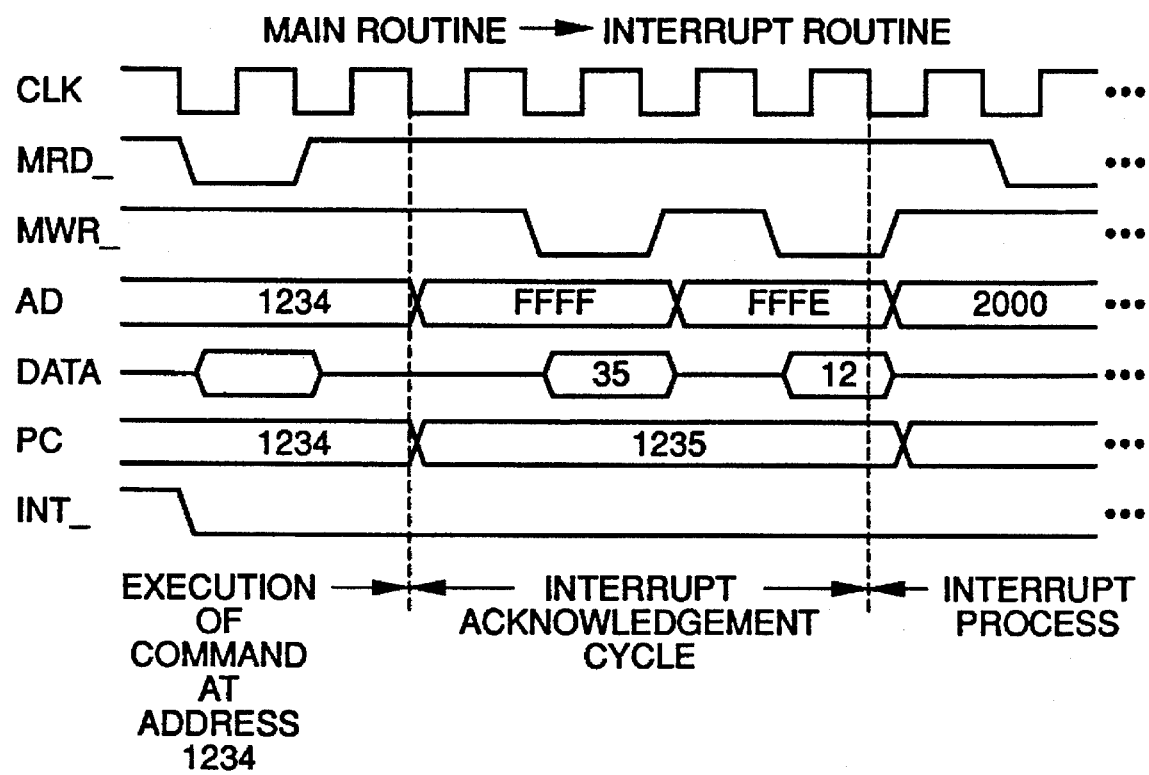
FIG. 6 is a timing chart in effect when an interrupt signal is input during an execution sequence of a MPU.
Figure 7:
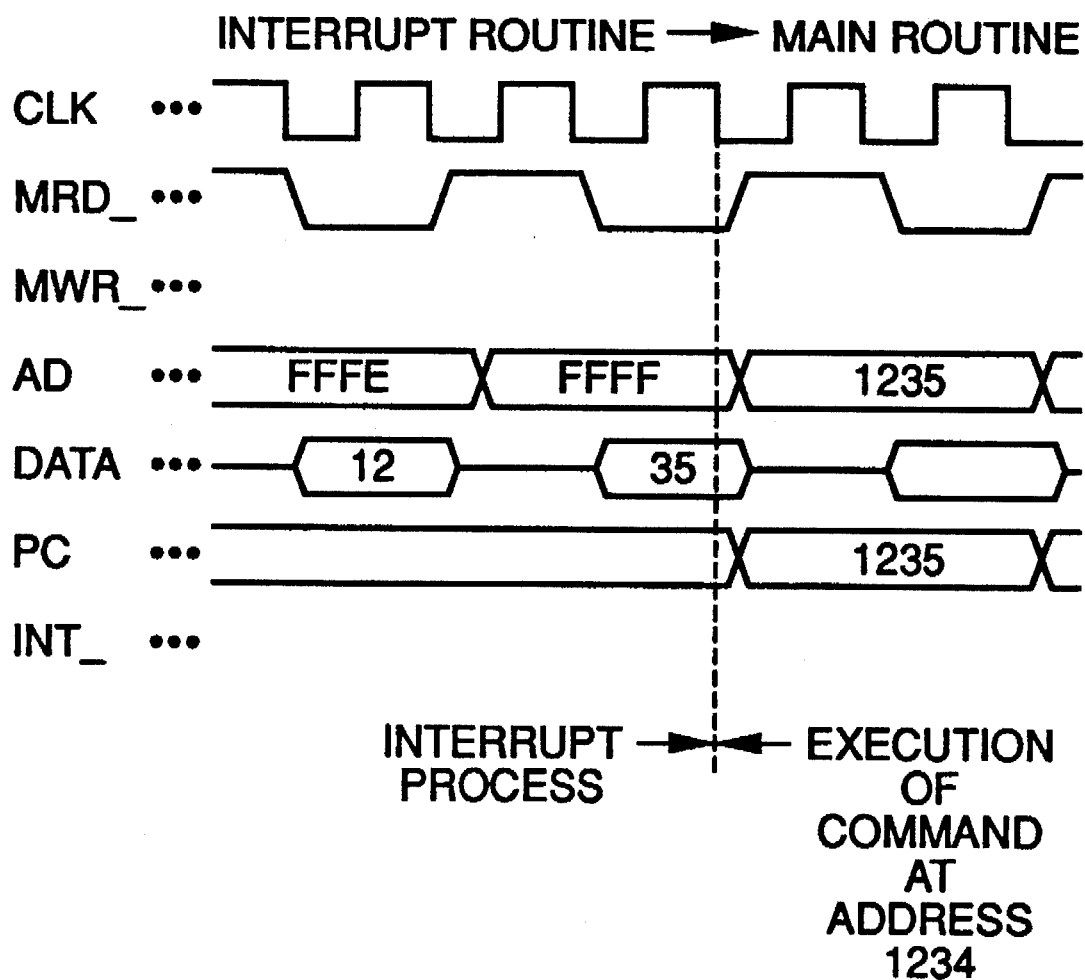
FIG. 7 is a timing chart in effect when the interrupt routine has ended during the execution sequence of the MPU.

FIG. 2 is a timing chart in effect when a predetermined interrupt is input during an execution sequence of the MPU of the invention, and FIG. 3 is a timing chart in effect when the interrupt routine has ended during the execution sequence of that MPU. The two charts correspond respectively to FIGS. 6 and 7 referenced above for description of the prior art.

During execution of the command at address 1234, an interrupt signal INT__ is asserted (i.e., brought Low). During an interrupt acknowledgment cycle, the low and high-order bytes of the program counter value "1235" are saved respectively at FFFF and FFFE which serve as a stack area. Thereafter an interrupt process is carried out. The branching destination for that process, i.e., the address indicated by arrow A in FIG. 2, differs depending on the kind of the command held at address 1234.

If a HALT command is stored at address 1234 and if the interrupt signal INT__ is input during execution of that HALT command, the processing branches illustratively to address 2000 (vector 1).

If a command other than the HALT command is held at address 1234 and if the interrupt signal INT is input during execution of that command, the processing branches illustratively to address 2010 (vector 2).

Between address 2000 and address 200F is a command that causes the value "1235" to be read from addresses FFFE and FFFF and decremented by 1 to generate "1234," the result being set again to addresses FFFE and FFFF. In this setup, if the HALT command is being executed upon receipt of the interrupt, the end of the interrupt process is followed by the halt state brought about by another execution of the HALT command at address 1234, as shown in FIG. 3. If a command other than the HALT command is being executed when the interrupt is received, the end of the interrupt process is followed by the execution of the next command, i.e., the command held at address 1235 as in the conventional case of FIG. 6.

Even where the processing is arranged to branch to a different address (e.g., address 2000 or 2010 in the above setup) depending on the command in effect upon receipt of the interrupt, it may be desired to carry out the same kind of processing regardless of the type of the command. In that case, a branch command may be set to address 2000 for branching to address 2010, or NOP commands may be set to addresses 2000 through 200F for performing no operation.

According to this invention, the commands may be divided not only into two groups (e.g., HALT command and the other commands) but also into more groups so that a different branching destination is assigned to each of these command groups for their respective appropriate processing. In this manner, the microprocessor unit of the invention provides high degrees of operational freedom and flexibility.

It should be apparent to those skilled in the art that the above-described embodiment is merely representative, which represents the applications of the principles of the present invention. Numerous and varied other arrangements can be readily devised by those skilled in the art without departing from the spirit and the scope of the invention.

What is claimed is:

1. A microprocessor unit for executing a plurality of commands sequentially and for branching to an interrupt process upon receipt of an interrupt, said microprocessor unit comprising:

a program counter pointing to an address having the command to be executed next, said address being contiguous to the address where the command currently executed exists;

an interrupt mechanism for saving the content of said program counter into a stack upon receipt of an interrupt and for branching to an interrupt process thereafter; and a branching destination selecting mechanism for selecting, upon receipt of at least one predetermined interrupt, a branching in accordance with the kind of command being executed when said predetermined interrupt is received, wherein the branching destination selecting mechanism selects a branching destination such that a sequence of commands located in memory contiguously to the interrupt process is executed immediately before execution of the interrupt process and wherein said branching destination corresponds to the kind of command being executed where said predetermined interrupt is received.

2. A microprocessor unit according to claim 1, wherein said plurality of commands includes a halt command for causing said microprocessor unit to halt command execution, and wherein said branching destination selecting mechanism selects the branching destination depending on whether the command being executed when said predetermined interrupt is received, is said halt command.

3. A microprocessor unit as in claim 2 wherein the saved content of said program counter on the stack is decremented, where the command being executed, when the predetermined interrupt is received is a halt command, such that the halt command is re-executed when the interrupt process is complete.

4. A microprocessor unit as in claim 2, wherein, if the command being executed is a halt command, the branching destination selecting mechanism selects a branching destination such that a sequence of commands located in memory contiguously to the interrupt process is executed to decrement the saved content of said program counter on the stack immediately before execution of the interrupt process.

* * * * *